United States Patent
Wang et al.

(10) Patent No.: US 9,282,183 B2
(45) Date of Patent: Mar. 8, 2016

(54) NODES AND METHODS FOR MONITORING OF COMMUNICATION

(75) Inventors: Chunbo Wang, Shanghai (CN); Volker Kleinfeld, Aachen (DE); Martin Blumbach, Hergenrath (BE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/396,342

(22) PCT Filed: Apr. 27, 2012

(86) PCT No.: PCT/EP2012/001821
§ 371 (c)(1),
(2), (4) Date: Oct. 22, 2014

(87) PCT Pub. No.: WO2013/159795
PCT Pub. Date: Oct. 31, 2013

(65) Prior Publication Data
US 2015/0140996 A1    May 21, 2015

(51) Int. Cl.
*H04W 24/00* (2009.01)
*H04M 3/24* (2006.01)
(Continued)

(52) U.S. Cl.
CPC ............... *H04M 3/24* (2013.01); *H04L 43/028* (2013.01); *H04L 43/12* (2013.01); *H04W 24/08* (2013.01)

(58) Field of Classification Search
CPC ....... H04M 3/24; H04L 43/028; H04L 43/12; H04W 24/08
USPC ........................................................ 455/423
See application file for complete search history.

(56) References Cited

U.S. PATENT DOCUMENTS 6,456,845 B1    9/2002   Drum et al.
7,280,505 B2 *  10/2007  Chaskar ............ H04W 36/0011
                                                      370/331
(Continued)

FOREIGN PATENT DOCUMENTS

IE   WO 2009045138 A1 *  4/2009   ............. H04L 12/24
WO   WO 2009/045138 A1    4/2009
WO   WO 2011/026525 A1    3/2011

OTHER PUBLICATIONS

3GPP TS 29.232 V10.3.0 (Dec. 2011) 3$^{rd}$ Generation Partnership Project; Technical Specification Group Core Network and Terminals; Media Gateway Controller (MGC)—Media Gateway (MGW) interface; Stage 3 (Release 10); 650 Route des Lucioles—Sophia Antipolis, Valbonne—France; 159 pages.

(Continued)

*Primary Examiner* — Tanmay Shah
(74) *Attorney, Agent, or Firm* — Myers Bigel & Sibley, P.A.

(57) ABSTRACT

A network node for a telecommunication network is provided. The network node includes a receiving unit adapted to receive a monitoring control message. The monitoring control message includes an identifier relating to a subscriber whose communication is to be monitored. A processing unit is adapted to determine one or more filter parameters for filtering communication relating to the subscriber based on the received monitoring control message. The network node also includes a sending unit adapted to send a filter parameter message indicative of the determined one or more filter parameters to a monitoring node separate from the network node for filtering of the communication relating to the subscriber in accordance with the one or more filter parameters.

26 Claims, 5 Drawing Sheets

(51) Int. Cl.
*H04L 12/26* (2006.01)
*H04W 24/08* (2009.01)

(56) References Cited

U.S. PATENT DOCUMENTS

| | | | |
|---|---|---|---|
| 8,781,442 B1* | 7/2014 | Link, II | G08G 1/205 |
| | | | 370/338 |
| 2002/0136231 A1* | 9/2002 | Leatherbury | H04L 12/2801 |
| | | | 370/442 |

OTHER PUBLICATIONS

3GPP TS 32.422 V11.3.0 (Mar. 2012) 3rd Generation Partnership Project; Technical Specification Group Services and System Aspects; Telecommunication management; Subscriber and equipment trace; Trace control and configuration management (Release 11); 650 Route des Lucioles—Sophia Antipolis, Valbonne—France; 121 pages.

International Search Report for International Application No. PCT/EP2012/001821 mailed Jan. 24, 2013, 4 pages.

Written Opinion of the International Searching Authority for International Application No. PCT/EP2012/001821 mailed Jan. 24, 2013, 5 pages.

3GPP TS 32.423 V11.1.0 (2012-03) 3rd Generation Partnership Project; Technical Specification Group Services and System Aspects; Telecommunication management; Subscriber and equipment trace; Trace data definition and management (Release 11); 650 Route des Lucioles—Sophia Antipolis, Valbonne—France; 79 pages.

* cited by examiner

NODES AND METHODS FOR MONITORING OF COMMUNICATION

CROSS REFERENCE TO RELATED APPLICATION

This application is a 35 U.S.C. §371 national stage application of PCT International Application No. PCT/EP2012/001821, filed on 27 Apr. 2012, the disclosure and content of which is incorporated by reference herein in its entirety. The above-referenced PCT International Application was published in the English language as International Publication No. WO 2013/159795 A1 on 31 Oct. 2013.

TECHNICAL FIELD

The invention relates to a network node for a telecommunication network. The invention also relates to a monitoring node for a telecommunication network. Beyond this, the invention relates to a method of operating a network node for a telecommunication network and to a method of operating a monitoring node for a telecommunication network. Further, the invention relates to program elements and a computer-readable medium.

BACKGROUND

Figure 4:
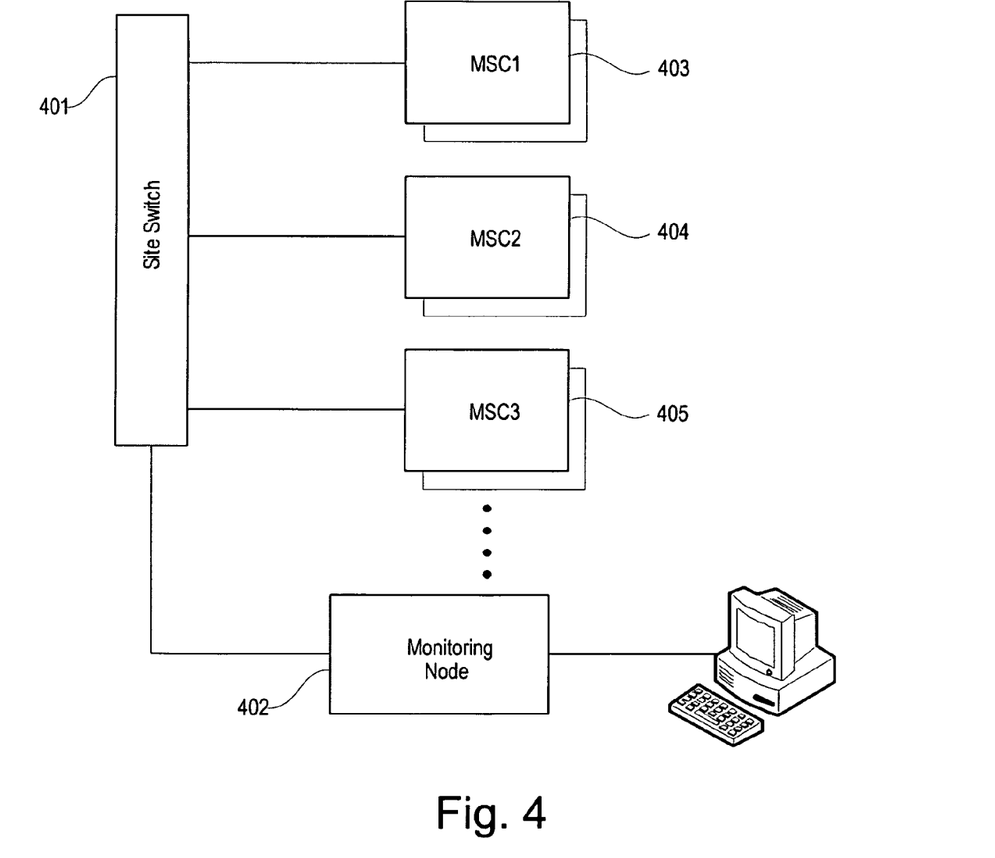
FIG. 4 schematically illustrate deployment of a monitoring node on a site.

Monitoring communication network performance is a requirement for well-performing communication networks. On some operators' networks, the operator deploys a third party signaling monitor which can capture all the incoming/outgoing site traffic and provide statistic results related to key performance indicators (KPIs), which is schematically shown in FIG. 4. In particular, FIG. 4 shows a site switch 401 which is on the one hand coupled to a third party signaling monitor 402 and on the other hand to a plurality of mobile switching centers (MSCs) 403, 404, and 405. The signaling monitoring system is a powerful tool to open service test in telecommunication network, complaint handling of subscribers, network failure position, and network and service analysis. It collects all kinds of signaling data through different ways without influence on network, such as high impedance cross connection, port mirror, TAP and optical splitter and so on.

Except the bulk tracing capability, the signaling monitor can also trace the messages for a specified subscriber. For example, if the temporary mobile subscriber identity (TMSI) of the specified subscriber is known in advance, the base station system application part (BSSAP) signaling or radio access network application protocol (RANAP) signaling for this subscriber can be filtered out.

To trace all messages for a specific subscriber the signaling monitor needs to decode all messages to a certain extent. It also has to mimic the call processing of the MSCs to correlate messages on the different protocol interfaces to call procedures and to correlate call procedures to the trace session of the specific subscriber. This is problematic as the signal monitor does not have the temporary call identifiers of a subscriber, so it may be difficult or even impossible for the monitor to correlate the signaling on different interfaces of a call procedure. The resulting complexity and the capacity requirements for such a signaling monitor can therefore become substantial if not prohibitive.

Known monitoring function (subscriber tracer) integrated with a network node has the following disadvantages:

(1) The integrated subscriber tracing function has load impact on the network node itself when a lot of subscribers are monitored at the same time.

(2) The trace or monitoring output provided by the network node only contains the application layer payload without the information of transport layers, such as signal connection control part (SCCP), message transfer part 3 (MTP3), or IP layers (see e.g. 3GPP TS 32.423).

(3) The monitoring occurs on node rather than network level, i.e. such level of monitoring does not provide for a global view, e.g. when the subscriber moves across multiple network nodes.

SUMMARY

It is an object of the invention to facilitate the provision of an efficient monitoring of communication relating to a subscriber of a telecommunication network.

In order to achieve the object defined above, a network node, a monitoring node, a system, a method of operating a network node, a method of operating a monitoring node, program elements and a computer readable medium according to the independent claims are provided.

According to an exemplary aspect a network node for a telecommunication network is provided, wherein the network node comprises a receiving unit adapted to receive a monitoring control message, the monitoring control message comprising an identifier relating to a subscriber whose communication is to be monitored, a processing unit adapted to determine one or more filter parameters for filtering communication relating to the subscriber based on the received monitoring control message. Further, the network node comprises a sending unit adapted to send a filter parameter message indicative of the determined one or more filter parameters to a monitoring node separate from the network node for filtering of the communication relating to the subscriber in accordance with the one or more filter parameters.

In particular, the network node may be a core or radio network node of the communication network. In particular, it should be mentioned that the filter parameter message may include an indication of the determined filter parameter itself, and/or an indication of a value of the respective filter parameter. Furthermore, it should be mentioned that of course during operation a plurality of filter parameter messages may be sent and/or the filter parameter message may be formed by or may comprise several sub filter parameter messages. In particular, the distribution of filter parameters as described above may enable standalone subscriber tracer which can filter out messages from the overall set of messages created by all network nodes on a site. An example for the filter parameter may be the so called subscriber identity. However, alternatively or in addition, the filter parameters may also be dynamic identifiers and/or transport layer information in relation to the communication relating to the subscriber.

According to an exemplary aspect a monitoring node for a telecommunication network comprising a network node which is separate from the network node, wherein the monitoring node comprises a receiving unit adapted to receive a filter parameter message indicative of one or more filter parameters for filtering communication relating to a subscriber in the telecommunication network, a processing unit adapted to filter said communication based on the received one or more filter parameters, and an output unit adapted to output the filtered communication.

According to an exemplary aspect a system is provided which comprises at least one network node according to an exemplary aspect, a monitoring node according to an exemplary aspect, and a user equipment of a subscriber whose communication in the telecommunication network is to be monitored.

According to an exemplary aspect a method of operating a network node is provided, wherein the method comprises receiving a monitoring control message, the monitoring control message comprising an identifier relating to a subscriber whose communication is to be monitored, determining one or more filter parameters for filtering communication relating to the subscriber based on the received monitoring control message, and sending a filter parameter message indicative of the determined one or more filter parameters to a monitoring node separate from the network node for filtering of the communication relating to the subscriber in accordance with the one or more filter parameters.

According to an exemplary aspect a method of operating a monitoring node for a telecommunication network comprising a network node which is separate from the monitoring node is provided, wherein the method comprises receiving a filter parameter message indicative of one or more filter parameters for filtering communication relating to a subscriber in the telecommunication network, filtering said communication based on the received one or more filter parameters, and outputting the filtered communication.

According to another exemplary aspect, a program element (for instance a software routine, in source code or in executable code) is provided, which, when being executed by a processor, is adapted to control or carry out a method according to an exemplary aspect having the above mentioned features.

According to yet another exemplary aspect, a computer-readable medium (for instance a CD, a DVD, a USB stick, a floppy disk or a hard disk) is provided, in which a computer program is stored which, when being executed by a processor, is adapted to control or carry out a method according to an exemplary aspect having the above mentioned features.

A gist of an exemplary aspect may be seen in that a division or separation of workload may be provided between a network node and a monitoring node. In particular, this division of workload may avoid significant changes and capacity degradation in the network node on the one hand and may on the other hand allow to output all messages for the traced subscriber by the monitoring node with little effort in message decoding. For example, for a call procedure, such as registration, basic call, supplementary service, short message service and handover/relocation, there are always some parameters which may be used to filter out the messages for a traced subscriber from the complete stream of communication messages. These filter parameters can be different on different interfaces and for different call procedures of a network node.

As the network node may have a complete locally overview of the call procedures or sessions handled by this network node for a subscriber whose communication has to be monitored or traced it may determine these filters parameters and send them to the monitoring node which in turn can filter out the messages. Thereby a complete locally overview may in particular mean that the respective network node can have a complete overview as far as the communication processes are controlled and/or accessible to the network node. Thus, it may be possible to not significantly increase the workload for the network node, in particular in case a plurality of subscribers or user equipments are to be monitored at the same time, while the majority of the workload may be shifted to a dedicated monitoring node. Such a shifting to a dedicated monitoring node therefore may reduce the impact on the network performance. Furthermore, on the same time it may be avoided that the information of transport layers, such as SCCP, MTP3 and IP layers, are not implemented in the monitoring since the monitoring node typically has also access to these layers in contrast to the network node the output of which normally only contains application payload. In particular, since 3GPP TS32.423 does not specify transport layer in the trace content but requires only monitoring of the application layers such as BSSAP, RANAP, mobile application part (MAP), gateway control protocol (GCP) and the like. But the transport information may often facilitate trouble shooting. Thus, it may be advantageous, when using a monitoring node, that the monitoring node may have access to all layers, even the transport layer.

It should be noted that the different units described above may be implemented in hardware and/or software. That is, the units may be formed or may comprise wired circuits or may be emulated or embodied by software or firmware residing on a processor or processing unit.

Summarizing, the combining of a network node determining a filter parameter sending the same to a monitoring node being separate from the network node and on the other hand a monitoring node being separate from the network node and receiving the parameter message and performing the actual filtering or monitoring may be advantageous. Since on the one hand the advantages of the network element, e.g. knowing the temporary or dynamic call identifiers of the subscribers (which may be used as filter parameters), is combined with the advantages of a monitoring node, e.g. having access to more layers (transport layers for example) and the fact that the monitoring node may provide a global view of the subscriber when it moves across multiple network nodes on a side, while not increasing the load on the network nodes. On the same time the disadvantages may be avoided.

In particular, the above described solution may save capacity of the network node where monitoring call procedures are activated as the network node may not continuously output the captured messages, but only the filters or filter parameters for a call procedure. Furthermore, the above described solution may allow to easily output messages on lower layers than application level, since core network nodes with their long development history might have access to such information only by prohibitively complex redesign. Additionally, the above described solution may have the complete on-site traffic picture of a concerned subscriber, including different domains such as circuits switched, packet switched and IP Multimedia Subsystem (IMS) and the complete protocol layers of captured packets.

The aspects defined above and further aspects are apparent from the examples of embodiment to be described hereinafter and are explained with reference to these examples of embodiment.

BRIEF DESCRIPTION OF THE DRAWINGS

Embodiments of the invention will be described in more detail hereinafter with reference to examples but to which the scope is not limited.

DETAILED DESCRIPTION

In the context of this application, the term "filter parameter" may particularly denote a parameter or a value of a parameter which can be used for filtering specific communication messages out of a plurality of messages. For example, a filter parameter may be a specific unique identifier of a subscriber or the respective value of the specific unique identifier. By using such a unique identifier it may be possible to filter all communication messages relating to the specific subscriber out of a great number of communication messages.

In the context of this application, the term "communication" may particularly denote that messages and information is exchanged between elements of a network, e.g. a telecommunication network, with the goal to realize one communication activity and to transport communication contents such as voice or other kind of information. An example of such an activity is a mobile telephony call. Hence, the term communication relates to an exchanging of signaling information between user equipment and network nodes or between network nodes and also covers the actual content, e.g. a user plane real-time transfer protocol (RTP), or payload data.

In the context of this application, the term "signaling messages" may particularly denote bit patterns exchanged between user equipment and network node or between network nodes as part of a protocol with the goal to provoke a defined response.

In the context of this application, the term "monitoring node" may particularly denote a device specifically adapted to monitor or trace a communication of a specific subscriber or a plurality of specific subscribers of a telecommunication network. A "signaling monitor" or "signaling monitoring node" may thus be a term for a monitoring node filtering in particular signaling messages as part of the communication relating to the subscriber.

Next, further exemplary embodiments of the network node or node will be explained. However, these embodiments also apply to the monitoring node, the system, the method of operating a network node, the method of operating a monitoring node, the computer readable medium and the program element.

In an exemplary embodiment of the network node, the communication relating to the subscriber comprises signaling messages and the monitoring node is a signaling monitoring node adapted to extract one or more of the signaling messages or parts thereof in accordance with the one or more filter parameters in the filter parameter message.

In an exemplary embodiment of the network node, the processing unit of the network node is further adapted to determine a telecommunication network wide unique communication reference identifier based on the received monitoring control message and the sending unit is adapted to send the filter parameter message comprising the determined communication reference identifier to the monitoring node. In particular, the telecommunication network wide unique communication reference identifier may be used in order to relate the filtered communication relating to the subscriber. Hence, it can be used to correlate filtered communication messages for the same subscriber. For example, the unique communication reference identifier may be a telecommunication network wide or globally unique call reference or global reference identifier. An example may be the so called subscriber identification (ID). In particular, a provision that such unique communication reference identifier can be used for (cor-)relating may enable a greater flexibility and security. For example, it may allow for multiple concurrent monitoring orders or that confidentiality of the monitoring result may be enabled. Further examples for usable filter parameters may be a SCCP connection reference, a SCCP source and destination address (both may in particular used for communication of a mobile switching center via radio access network (RAN) interface messages), a bearer independent call control (BICC) routing label (in particular for communication of a mobile switching center via core network interface), a transaction capabilities application part (TCAP) transaction ID, a SCCP address (both may in particular be used for communication of a mobile switching center via home location register (HLR) interface) and destination transport address and/or a GCP termination ID (both may in particular be used for communication of a mobile switching center via media gateway (MGW) interface).

The use of such a telecommunication network wide unique reference may in particular be suitable to correlate communication messages on different interfaces for the same call procedure of a subscriber to be monitored or traced. In particular, the telecommunication network wide unique reference may be sent together with each filter parameter to the monitoring node. Based on the telecommunication network wide unique communication reference the monitoring node may correlate the filtered messages on different interfaces of the same call procedure.

There are common parameters for messages of a protocol interface during a call procedure. These common parameters may be used as or may be called filters or filter parameter. For example, the SPC and SCCP reference of a network node (mobile switching center (MSC) or serving GPRS support node (SGSN)) may uniquely identify the connection oriented or signaling messages between RAN and CN. For TCAP based communication or transaction, the SCCP address and TCAP communication or transaction identification of the network node may uniquely identify a TCAP message corresponding to a communication or transaction.

In an exemplary embodiment of the network node, the processing unit of the network node is further adapted to determine the one or more filter parameters based on one or more dynamic identifiers in relation to the communication relating to the subscriber handled by the network node (and in accordance with the received monitoring control message). Dynamic identifiers are communication-related identifiers that are generated in the course of the communication, e.g. during communication establishment, ongoing communication, or communication termination. Dynamic identifiers may be SCCP connection references and addresses, TCAP transaction IDs, for example. Hence, the monitoring node may be able to filter out all the signaling traffic related to a specified subscriber although it has primarily no access to the temporary subscriber identifiers such as TMSI, mobile station roaming number (MSRN) and other dynamic parameters related to a call procedure. These temporary identifiers or dynamic parameters may be available in a network node, like the MSC Server, where the subscriber is registered.

In an exemplary embodiment of the network node, the processing unit of the network node is further adapted to determine the one or more filter parameters based on transport layer information in relation to the communication relating to the subscriber handled by the network node (and in accordance with the received monitoring control message).

Additionally or alternatively information of basic parameters of the application layer may be used, e.g. ISUP CIC (ISDN user part circuit identification code) or GCP termination identifiers. In case a separate transport connection is established per call procedure of a respective subscriber the transport connection identifiers, i.e. information of a transport layer, may be used, e.g. signal point code (SPC) and SCCP connection reference.

The use of filter parameters based on information of a transport layer or basic parameters of the application layer may in particular be advantageous since in this case a necessary message decoding in the signaling monitor may be minimized.

In an exemplary embodiment of the network node, the processing unit of the network node is further adapted to determine a control parameter comprising at least one instruction to remotely control the filtering at the monitoring node and the sending unit of the network node is adapted to send the control parameter to the monitoring node. A possible example for an instruction may be a time stamp to activate or stop the monitoring or any other kind of condition, that when being fulfilled, activates or stops the monitoring or could modify the filtering (e.g. some filters are switched off after a while, while some others are kept, or filter parameters may be even modified).

In case the instruction is a time stamp or is associated with a time stamp and the respective control parameter including the time stamp is sent to the monitoring node, e.g. by the filter parameter message, the use of the sent time stamp may particularly allow or enable that a time window may be defined for the monitoring node to scan and filter and/or a time window for the use of a specific filter parameter or filter. Such a time stamp may facilitate that a filter or filter parameter is invalidated after a predetermined time span. In this case, when a new message related to the filter is sent or received after the time window period, the network node may be adapted to send an update message with the parameters of the filter to the signaling monitor. Such an update message may be used by the monitoring node to update living filters. When receiving a filter update or notification the monitoring node may apply an expiry time stamp to the respective filter.

Furthermore, it should be mentioned that the control parameter might be included in the (further) filter parameter message(s) or in other messages, e.g. a so called release message or even a specific message dedicated to the sending or transmitting of the control parameter.

In an exemplary embodiment, the network node may be a core network node for the telecommunication network. The use of the core network (CN) node as the network node determining the filter parameter may in particular be advantageous since the CN network node typically has a complete globally overview of a call procedure of a subscriber to be monitored. Thus, it can determine one or several filter parameters and/or values of the one or several filter parameters and send them to a monitoring node which in turn then may filter out messages, e.g. may filter out messages for a specific subscriber. This splitting of work may avoid significant changes and capacity degradation in the (CN) network node on one hand and may on the other hand allow to output all layers of messages for the subscriber to be monitored by the monitoring node with little effort in message decoding.

In an exemplary embodiment of the network node the determination unit of the network node is adapted to determine the filter parameter based on information of a transport layer of the received signal.

In an exemplary embodiment the network node is further adapted to send a release message. In particular, the release message may be used by a monitoring node to release or discard the filter parameter at a specific point in time.

The provision of a time stamp and/or the sending of an explicit release message may be two alternatives in order to enable the signaling monitor to release some resources after a predetermined time span or at a specific point in time or to update a filter or filter parameter.

Next, further exemplary embodiments of the monitoring node will be explained. However, these embodiments also apply to the network node, the system, the method of operating a network node, the method of operating a monitoring node, the computer readable medium and the program element.

In an exemplary embodiment, the monitoring node further comprises a buffer adapted to buffer communication.

In particular, the buffer or buffer memory may be adapted to buffer or maintain communication or communication messages for a predetermined time span, e.g. a time span which is sufficient to scan and/or filter the communication messages using the received filter parameter. By providing such a buffer it may be possible to scan or filter old communication messages which were already transmitted in the telecommunication network before the monitoring node received the filter parameter message indicative of the determined filter parameter(s). A suitable buffer size may be determined based on the memory or storage size necessary for buffering the communication for a predetermined time span. For example, the time span may at least cover the time span necessary for a network node, e.g. a core network node, to determine an identifier of a specific subscriber, e.g. a subscriber to be monitored, and to send a respective filter parameter message. Such a time span may be between one and 20 seconds, or between one and ten seconds or may be a few seconds.

In an exemplary embodiment, the monitoring node is a signaling monitoring node adapted to extract one or more signaling messages or parts thereof in accordance with the one or more filter parameters in the filtering, wherein the signaling messages is comprised in the communication relating to the subscriber.

In an exemplary embodiment of the monitoring node, the processing unit of the monitoring node is adapted to relate (e.g. to correlate) the filtered communication to a telecommunication network wide unique communication reference identifier, wherein the telecommunication network wide unique communication reference identifier is comprised in the filter parameter message.

In an exemplary embodiment of the monitoring node, the receiving unit of the monitoring node is adapted to receive at least one further filter parameter message from at least one further network node, each of the at least one further filter parameter message(s) comprising said communication reference identifier and the processing unit of the monitoring node is adapted to relate (e.g. to correlate) the filtered communication to said communication reference identifier.

In particular, the further filter parameter messages comprise further filter parameter(s). Thus, the further filter parameter(s) may be used for filtering or may be used for updating or changing the filtering or filtering procedure. For example, the further filter parameter(s) may be identical or different from the one or more filter parameter.

In an exemplary embodiment of the monitoring node, the one or more filter parameters are based on one or more dynamic identifiers and/or on transport layer information in relation to the communication relating to the subscriber handled by the network node.

In particular, further filter parameters may be based on the one or more dynamic identifiers as well.

In an exemplary embodiment of the monitoring node, the receiving unit of the monitoring node is adapted to receive a control parameter comprising at least one instruction to remotely control the filtering at the monitoring node and the processing unit of the monitoring node is adapted to control the filtering in accordance with the at least one instruction.

In an embodiment, the monitoring node is adapted to release a received filter parameter.

In particular, the releasing of the filter parameter or the invalidating of a used filter parameter may be based on a time stamp received at the monitoring node, e.g. together or separate to the filter parameter message, and/or on a received specific release message. The releasing itself may be performed by implicitly releasing the filters by applying an expiry time stamp for each filter. In particular, the filters corresponding to the filter parameter may be released together with the releasing of a call procedure or together with an interface of the call procedure since in this case the filters are out of date. Instead or additionally to the receiving of a time stamp at the monitoring node, the monitoring node itself may apply an expiry time stamp when receiving a filter parameter message including a respective notification or filter update.

In the following, more detailed examples of embodiments are described with reference to the figures. However, it is to be understood that this description and all embodiments can be generalized to other systems in line with the general features as described above. Some examples for such generalizations are indicated in the following text.

Figure 1:
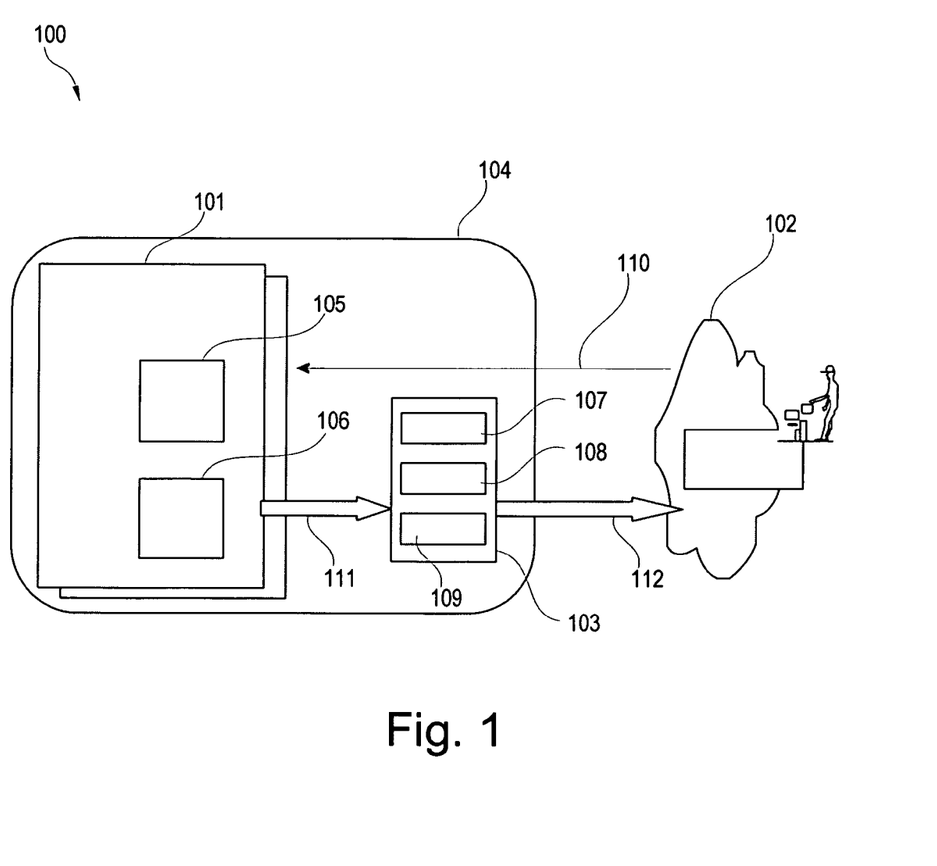
FIG. 1 schematically illustrates a basic telecommunication network according to an exemplary embodiment.

FIG. 1 schematically illustrates a basic telecommunication network 100 according to an exemplary embodiment. In particular, FIG. 1 depicts a core network (CN) node 101, an operator interface of an operation and maintenance (O&M) site 102, and a monitoring node 103. The CN node 101 and the monitoring node 103 may be part of a single site which is schematically indicated by reference sign 104. The CN node 101 comprises a processing unit (or determination unit) 105 which may be used for determining filter parameters (or values of filter parameters) and a sending unit 106 which may be used to send a filter parameter message including the determined filter parameters to the monitoring node 103. Furthermore, the monitoring node 103 comprises a receiving unit 107 for receiving communications or messages, a processing unit (or filtering unit) 108 adapted to filter communications, e.g. taking into account filter parameters received with a filter parameter message, and an output unit 109 adapted to output the filtered communication, e.g. via message 112 to the O&M site 102. Furthermore, the monitoring node 103 comprises a buffer (not shown) adapted to store messages, e.g. communication messages and/or filter parameter messages. An operator can activate a monitoring call procedure or monitoring session on a CN network node for a concerned subscriber by giving mobile subscriber ISDN (MSISDN) or international mobile subscriber identity (IMSI) of a mobile subscriber 110. The operator can specify the mode of trace output: either the CN network node directly outputs the monitoring data (if implemented in the network node) or only outputs the filters.

After receiving of the activation the CN network node may detect or determine suitable filter parameters for a certain user interface of a call procedure for a subscriber to be monitored. After the determination the CN network node sends a filter parameter message indicative including information corresponding to filter parameters to the monitoring node via the communication interface 111.

Based on the received filter parameters the monitoring node will filter out communications or messages related to the traced subscriber or the subscriber to be monitored and output via message 112 the respective filtered communications to the O&M site 102. The communications filtered out may contain not only application layer information, but also transport layer information, network layer information and/or link layer information.

A basic concept of an exemplary aspect may be based on the fact that for a call procedure, such as registration, basic call, supplementary service, short message service and handover/relocation, there may be always some parameters which can be used to filter out the communications for a subscriber to be monitored from the complete stream of communications on a site. These filter parameters may be different on different interfaces and for different call procedures of a network node, e.g. a core network node.

As the network node normally has a complete locally overview of the call procedures handled by this network node for a subscriber to be monitored it can determine these filter parameters and send them to the monitoring node which in turn can filter out the communications. This splitting or separation of work or workload may avoid significant changes and capacity degradation in the network node on one hand and output all layers of the communications for the subscriber to be monitored by the monitoring node with little effort in message decoding.

In particular, the filter parameters may be selected so that the message decoding in the monitoring node is minimized. Typical filter parameters may therefore be transport connection identifiers if a separate transport connection is established per interface (e.g. SCCP connection reference) or very basic application layer parameters (e.g. ISUP routing label or GCP termination identifiers).

Figure 2:
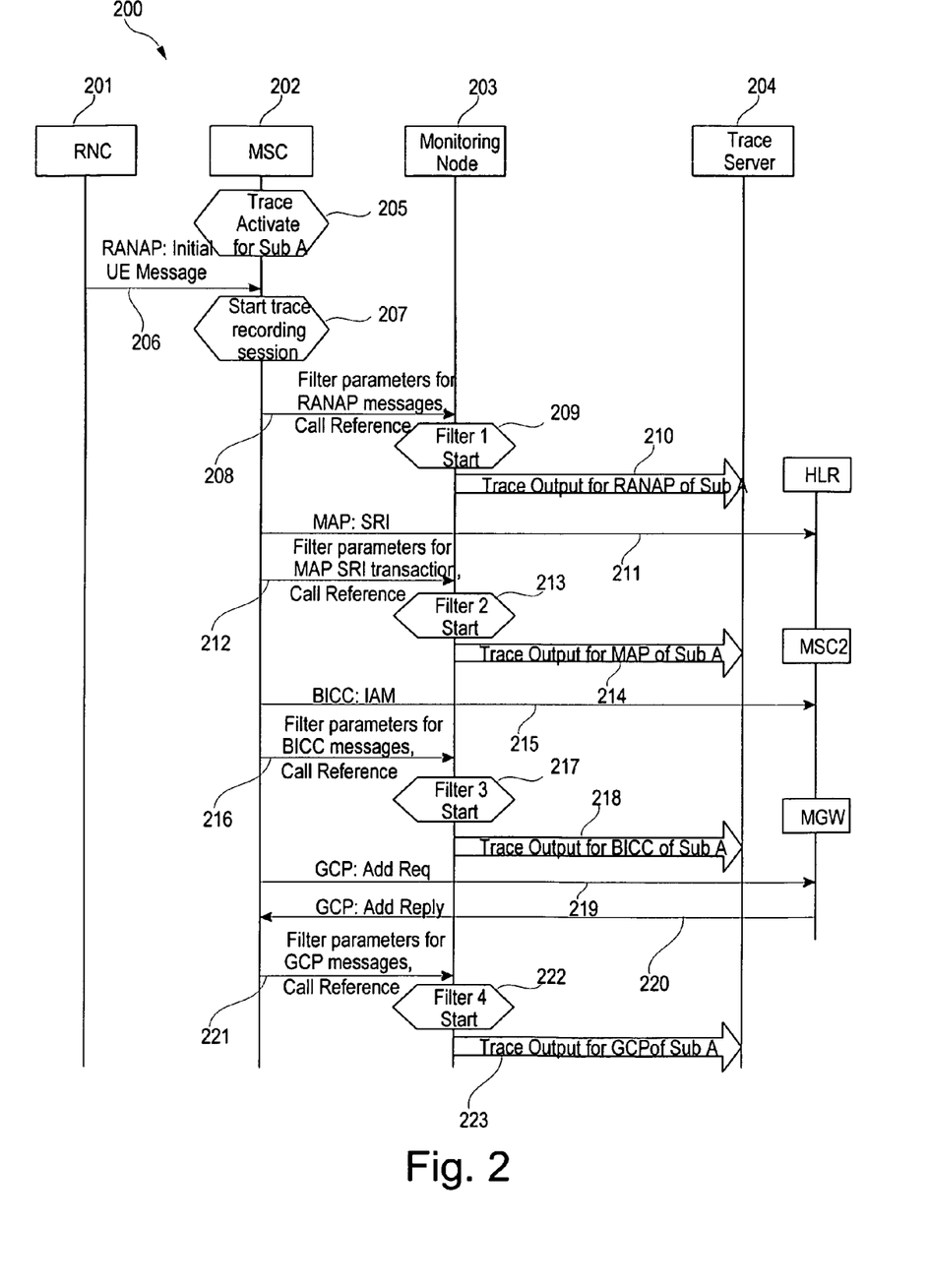
FIG. 2 schematically illustrates a method according to an exemplary embodiment for different transport protocols in case of circuit switched calls.

FIG. 2 schematically illustrates a method according to an exemplary embodiment for different transport protocols in case of circuit switched (CS) calls in a circuit switched core network 200. FIG. 2 shows an example for a mobile originating call in the circuit switched core network. In general the call is setup or call procedure is initiated from the radio network controller (RNC) to the mobile switching center (MSC), which may function as or form part of a network node, using RANAP and then to the core network using BICC. In-between the home location register (HLR) is interrogated using MAP. The MSC controls a media gateway (MGW) for the user plane using GCP.

In particular, FIG. 2 shows schematically the radio network controller (RNC) 201, the MSC 202, a monitoring node or signaling monitor 203, and a trace server 204. In a first step 205 tracing for or monitoring of a subscriber A is activated at the MSC. Afterwards a call is setup from the RNC to the MSC using RANAP 206 whereupon a trace recording call procedure is started 207 at the MSC, so that monitoring and filtering of a communication relating to the subscriber A can be performed. Before, after, as part of, or alternatively to this start of a trace recording call procedure the MSC may determine suitable filter parameters.

The application layers and transport protocols involved for different messages may be:
BSSAP and RANAP are sent over connection oriented SCCP.
MAP is sent over TCAP and connectionless SCCP.
BICC is sent over MTP
GCP is sent over SCTP.
In a next step, an SCCP connection is setup for RANAP and the MSC sends a filter parameter message 208 including the SCCP connection reference and SPC addresses as filter parameters to the monitoring node. Additionally it includes a telecommunication network wide unique communication reference identifier. Based on the filter parameters a first filter starts 209 and the monitoring node traces, monitors or filters the communication or output for RANAP of the subscriber A 210.

Additionally, the HLR may be interrogated using MAP 211. For TCAP based transactions (over SCCP connection less transport) for MAP the following steps may further be performed: after a TCAP TC-BEGIN (and CONTINUE) exchange, the MSC sends a further filter parameter message 212 including the SCCP address and TCAP transaction ID as filter parameters to the monitoring node. Additionally it includes the same telecommunication network wide unique communication reference identifier as in step 208. After receiving of the further filter parameter message a second filter starts 213 and the monitoring node traces, monitors or filters the communication or output for MAP of the subscriber A 214.

Additionally, the call setup may continue to a second MSC (MSC2) using BICC 215. For BICC messages the MSC sends a further filter parameter message 216 including the CIC and MTP routing label for the call to the monitoring node. Additionally it includes the same telecommunication network wide unique communication reference identifier as in step 208. After receiving of the further filter parameter message a third filter starts 217 and the monitoring node traces, monitors or filters the communication or output for BICC of the subscriber A 218.

For GCP messages the following procedure may be added. After a first GCP Add Request and Add Reply exchange 219 and 220, respectively between the MSC 202 and the MGW, the MSC 202 sends a further filter parameter message 221 including the GCP transaction and context ID as filter parameters to the monitoring node. Alternatively GCP termination IDs could be used. Additionally it includes the same telecommunication network wide unique communication reference identifier as in step 208. After receiving of the further filter parameter message a fourth filter starts 222 and the monitoring node traces, monitors or filters the communication or output for GCP of the subscriber A 223.

Figure 3:
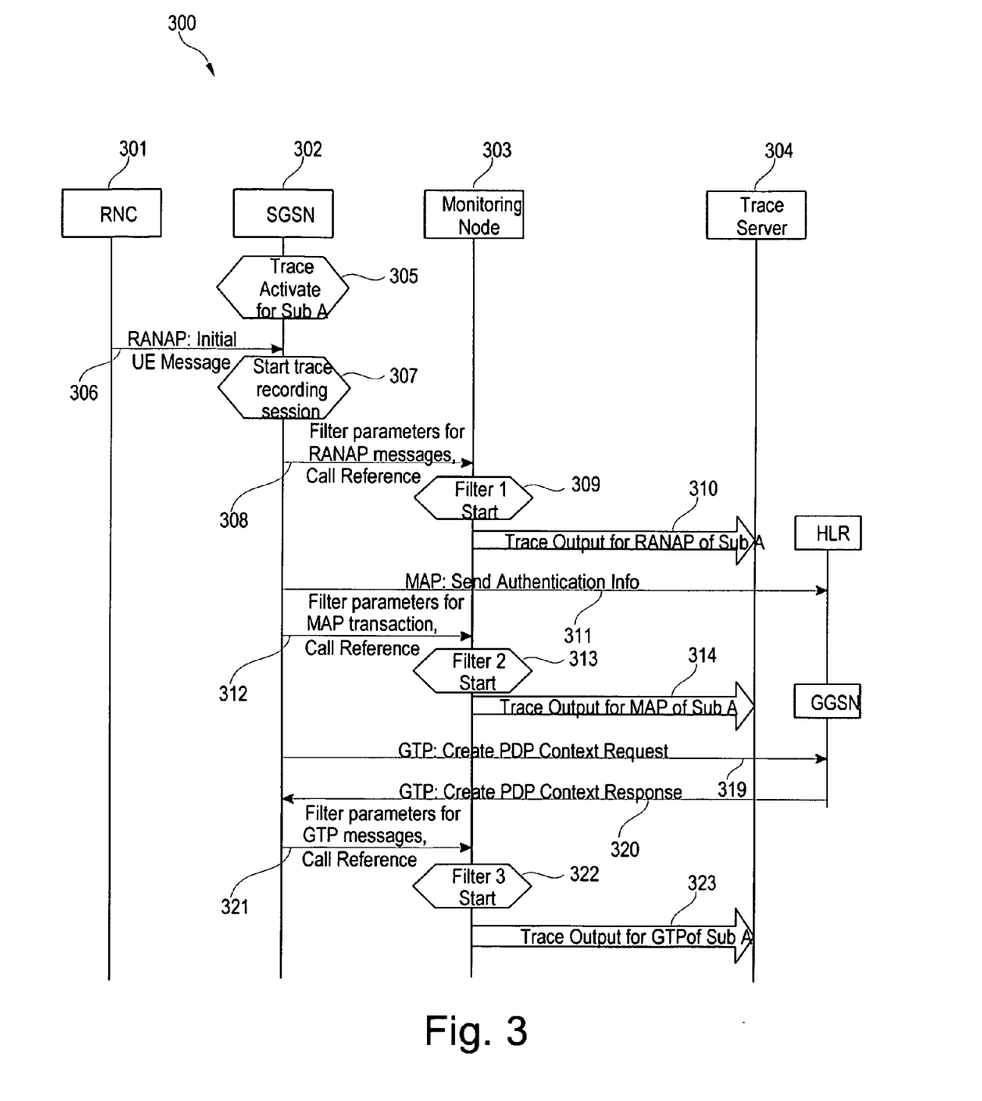
FIG. 3 schematically illustrates a method according to an exemplary embodiment for different transport protocols in case of packet switched calls.

The same principle as described in connection with FIG. 2 can be also applied to packet switched (PS) domain, as shown in FIG. 3. The filters for RANAP and MAP are the same as the CS call. For GPRS tunneling protocol (GTP) messages, the GTP tunnel Id and the corresponding node IP address may be used as the filter.

FIG. 3 schematically illustrates a method according to an exemplary embodiment for different transport protocols in case of PS calls in a packet switched core network 300. FIG. 3 shows an example for a mobile originating call in the packet switched core network. In general the call is setup from the RNC to a SGSN, which may function as or form a network node, using RANAP.

In particular, FIG. 3 shows schematically the RNC 301, the SGSN 302, a monitoring node 303, and a trace server 304. In a first step 305 tracing for a subscriber A is activated at the SGSN. Afterwards an initial user equipment (UE) communication or message is sent from the RNC to the SGSN using RANAP 206 whereupon a trace recording call procedure 307 is started at the SGSN, so that monitoring and filtering of a communication relating to the subscriber A can be performed. Before, after, as part of or alternatively to this start of a trace recording call procedure the SGSN may determine suitable filter parameters.

In a next step a connection is setup for RANAP and the SGSN sends a filter parameter message 308 including the filter parameters and a telecommunication network wide unique communication reference identifier to the monitoring node. Based on the filter parameters a first filter starts 309 and the monitor node traces, monitors or filters the communication or output for RANAP of the subscriber A 310.

Additionally, the HLR may be interrogated using MAP 311. Afterwards a connection is setup for MAP and the SGSN sends a further filter parameter message 312 including filter parameters and the telecommunication network wide unique communication reference identifier to the monitoring node. After receiving of the further filter parameter message a second filter starts 313 and the monitoring node traces, monitors or filters the communication or output for MAP of the subscriber A 314.

Afterwards a GTP connection may be setup. After a first GTP Create PDP (packet data protocol) Context Request and Response exchange 319 and 320, respectively between the SGSN 302 and a gateway GPRS support node (GGSN), the serving GPRS support node (SGSN) 302 sends a further filter parameter message 321 including the filter parameters and the telecommunication network wide unique communication reference identifier to the monitoring node. After receiving of the further filter parameter message a third filter starts 322 and the monitoring node traces, monitors or filters the communication or output for GTP of the subscriber A 223.

Based thereon a procedure may include one or several of the following steps or measures:

(1) When a network node, e.g. a core network node, determines or detects the unique filter parameter for a protocol interface during a call procedure of a subscriber to be monitored, the node may send this filter parameter to the monitoring node (or signaling monitor), e.g. via a filter parameter message. Based on this filter parameter, the monitoring node may start to scan and filter the communications on the protocol interface corresponding to the call procedure, if a communication matches the filter this communication may be output to the specified user interface.

(2) In order to correlate the communications on the different interfaces for the same call procedure of a subscriber to be monitored, the (CN) node may also provide a telecommunication network wide unique communication reference identifier together with each filter parameter to the monitoring node. Based on that, the monitoring node may correlate the filtered communications on different interfaces of the same call procedure.

(3) In order to facilitate the scan and filtering process, the filter parameters may be mainly based on the information of a transport layer, such as SCCP or MTP3. In this way, the monitoring node may save the processing time of decoding the complete packet. The filter parameter may also be associated with a time stamp (as an example for a control parameter for remotely controlling the filtering) to indicate the time window for the monitoring node to scan and filter.

(4) When a call procedure is released or an interface of the call procedure is released, the corresponding out of date filters or filter parameters may be released as well. There are several ways to release the out of date filter parameters:

(4a) The network node explicitly notifies the monitoring node of the setup and release of a filter parameter;

(4b) The monitoring node implicitly releases the filter parameters by applying an expiry time stamp for each filter parameter. With this method, the network node may update the monitoring node with the living filters or filter parameters on demand. The monitoring node may apply an expiry timestamp when receiving a filter parameter notification/update as an example for a remote control of the filtering based on a control parameter.

(5) A protocol for the interface between network node and monitoring node may be defined to transfer the necessary filter parameters, call reference and other parameters.

(6) As the filter parameters may be received by the monitoring node after initial messages of a communication have already passed it, it may be advantageous that the monitoring node maintains a buffer of messages for the last few seconds, so that also these "historical" messages may be filtered according to the filter parameters.

Figure 5:
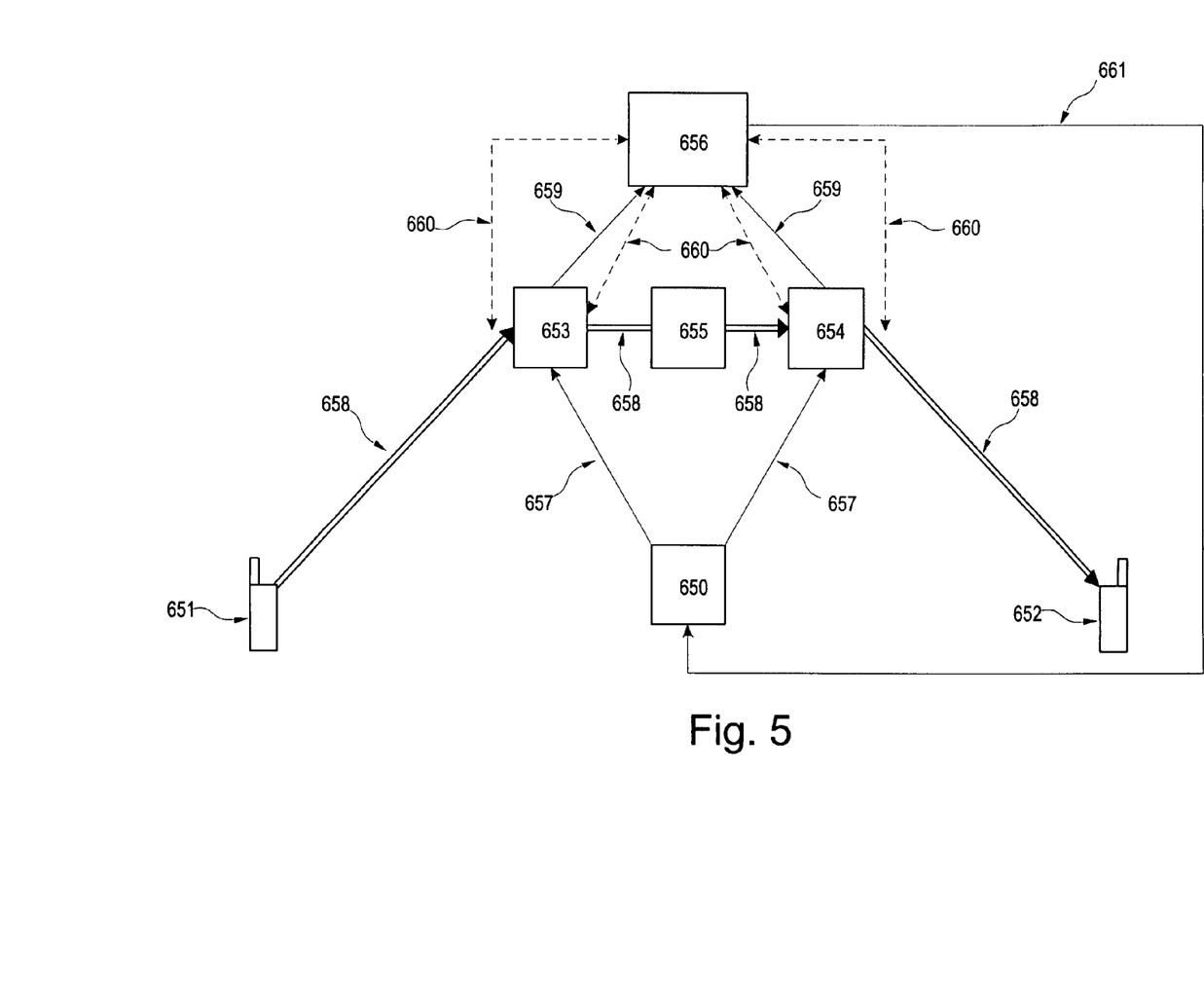
FIG. 5 schematically illustrate a message flow in a communication network according to an exemplary embodiment.

FIG. 5 schematically illustrates a message flow in a communication network according to an exemplary embodiment. In particular, FIG. 5 illustrates a portion of a schematic telecommunication network including an operator site 650 such as an O&M center, a first user equipment 651, e.g. a mobile terminal of a first subscriber, and a second user equipment 652, e.g. a mobile terminal of a second subscriber. The first and second user equipments 651 and 652 may be connected or may be connectable to a first network node 653 and a second network node 654, respectively. A further network node 655 may be connected between the first network node 653 and the second network node 654 in order to facilitate a communication between the both network nodes and thus between the both user equipments. Furthermore, FIG. 5 schematically depicts a monitoring node 656 operatively connected to the first and second network nodes 653 and 654 and operator site 650.

In case a communication between the first user equipment 651 and the second user equipment 652 shall be monitored the operator may control (e.g. activate) monitoring at the first network node 653 and the second network node 654 but—according to this example—not at the further network node 655. In order to enable the monitoring of the communication relating to the first subscriber, i.e. operating the first user equipment 651, the respective communication may be identified by the subscriber ID of the first subscriber. Furthermore, a telecommunication network wide unique global reference ID for later correlation of the monitoring result may be automatically generated. The respective subscriber ID and the telecommunication network wide unique global reference ID may be sent from the operator to first and second network nodes 653 and 654, which is schematically illustrated by the arrows 657.

An example of a communication, which shall be monitored, may be a call which is set up by the first subscriber, i.e. operating the first user equipment 651, and transmitted by the first, the further, and the second network nodes 653, 655, 654 to the second subscriber/user equipment 652. The communication is schematically illustrated by the arrows 658.

In a next step the first and second network nodes 653 and 654 may determine filter parameter(s) for filtering in accordance with the respective monitoring control messages 657. As the contents of the respective monitoring control messages as well as the network nodes 653, 654 can be different, the filter parameter(s) determined at each of the network nodes 653, 654 can be different (not excluding that they can be also identical or partly identical).

The respective filter parameter(s) can then be sent to the monitoring node 656 by including the same telecommunication network wide unique global reference ID in a filter parameter message. It should be mentioned that the filter parameter(s) may be included in a single filter parameter message or may be distributed via a plurality of filter parameter messages. The sending of the filter parameter messages is schematically illustrated by the arrows 659.

A filter parameter message sent from network node 653 to the monitoring node 656 may have the following contents (in the example, and for illustration purpose only, the network node 653 may be an MSC with interfaces to a RNC, to a second MSC in the core network, a HLR, and a MGW):
Filter Parameter Message MSC
Global Reference ID
Filter Parameter 1 (RAN Interface Messages)
  SCCP connection interface
  SCCP source and destination addresses
Filter Parameter 2 (Core Network Interface)
  BICC routing label
Filter parameter 3 (HLR Interface)
  TCAP Transaction ID
  SCCP source and destination addresses
Filter Parameter 4
  SCTP source and destination transport address
  GCP termination IDs.

After receiving the filter parameter messages via 659 the monitoring node 656 may extract the filter parameters out of the filter parameter messages and using the extracted filter parameter to filter the communication (e.g. all signaling messages) in the network according to the received filter parameters. For enabling such a filtering in the monitoring node 656, the monitoring node 656 receives as well the whole communication (or in the particular case of a signaling monitor it may be advantageous to receive only the signaling messages of the communication) which is schematically illustrated by the dashed arrows 660.

Furthermore, the monitoring node 656 reports the filtered communication of the first subscriber together with the telecommunication network wide unique reference ID as monitoring result to the operator. The operator may correlate the monitoring result to the initial order based on the telecommunication network wide unique global reference ID. The reporting is schematically illustrated by the arrow 661.

The invention claimed is:

1. A network node for a telecommunication network, wherein the network node comprises:
   a receiving circuit adapted to receive a monitoring control message, the monitoring control message comprising an identifier relating to a subscriber whose communication is to be monitored;
   a processing circuit adapted to determine one or more filter parameters for filtering communication relating to the subscriber based on the received monitoring control message,
   wherein the one or more filter parameters comprise one or more dynamic identifiers and/or transport layer information in relation to at least a portion of the communication relating to the subscriber handled by the network node, and
   wherein the dynamic identifiers are communication-related identifiers that are generated for the at least a portion of the communication relating to the subscriber handled by the network node; and
   a sending circuit adapted to send a filter parameter message indicative of the determined one or more filter parameters to a monitoring node separate from the network node for filtering of the communication relating to the subscriber in accordance with the one or more filter parameters.

2. The network node according to claim 1, wherein the communication relating to the subscriber comprises signaling messages and the monitoring node is a signaling monitoring node adapted to extract one or more of the signaling messages or parts thereof in accordance with the one or more filter parameters in the filter parameter message.

3. The network node according to claim 1, wherein the processing circuit is further adapted to determine a telecommunication network wide unique communication reference identifier based on the received monitoring control message and the sending circuit is adapted to send the filter parameter message comprising the determined communication reference identifier to the monitoring node.

4. The network node according to claim 1, wherein the processing circuit is further adapted to determine a control parameter comprising at least one instruction to remotely control the filtering at the monitoring node and the sending circuit is adapted to send the control parameter to the monitoring node.

5. The network node according to claim 1, wherein the dynamic identifiers are generated for establishment of the at least a portion of the communication relating to the subscriber handled by the network node, for ongoing communications of the at least a portion of the communication relating to the subscriber handled by the network node, and/or for termination of the at least a portion of the communication relating to the subscriber handled by the network node.

6. The network node according to claim 1, wherein the dynamic identifiers are different from a subscriber identity.

7. A monitoring node for a telecommunication network comprising a network node which is separate from the monitoring node, wherein the monitoring node comprises:
a receiving circuit adapted to receive a filter parameter message indicative of one or more filter parameters for filtering communication relating to a subscriber in the telecommunication network,
wherein the one or more filter parameters comprise one or more dynamic identifiers and/or transport layer information in relation to at least a portion of the communication relating to the subscriber handled by the network node, and
wherein the dynamic identifiers are communication-related identifiers that are generated for the at least a portion of the communication relating to the subscriber handled by the network node;
a processing circuit adapted to filter said communication based on the received one or more filter parameters; and
an output circuit adapted to output the filtered communication.

8. The monitoring node according to claim 7, wherein the monitoring node further comprises a buffer adapted to buffer communication in the telecommunication network.

9. The monitoring node according to claim 7, wherein the monitoring node is a signaling monitoring node adapted to extract one or more signaling messages or parts thereof in accordance with the one or more filter parameters in the filtering, wherein the signaling messages are part of the communication relating to the subscriber.

10. The monitoring node according to claim 7, wherein the processing circuit is adapted to relate the filtered communication to a telecommunication network wide unique communication reference identifier, wherein the telecommunication network wide unique communication reference identifier is comprised in the filter parameter message.

11. The monitoring node according to claim 10, wherein the receiving circuit is adapted to receive at least one further filter parameter message from at least one further network node, each of the at least one further filter parameter message comprising said communication reference identifier and the processing circuit is adapted to relate the filtered communication to said communication reference identifier.

12. The monitoring node according to claim 7, wherein the receiving circuit is adapted to receive a control parameter comprising at least one instruction to remotely control the filtering at the monitoring node and the processing circuit is adapted to control the filtering in accordance with the at least one instruction.

13. A system comprising at least one network node according to claim 1, a monitoring node and a user equipment of a subscriber whose communication in the telecommunication network is to be monitored.

14. The monitoring node according to claim 7, wherein the dynamic identifiers are generated for establishment of the at least a portion of the communication relating to the subscriber handled by the network node, for ongoing communications of the at least a portion of the communication relating to the subscriber handled by the network node, and/or for termination of the at least a portion of the communication relating to the subscriber handled by the network node.

15. A method of operating a network node for a telecommunication network, wherein the method comprises:
receiving a monitoring control message, the monitoring control message comprising an identifier relating to a subscriber whose communication is to be monitored;
determining one or more filter parameters for filtering communication relating to the subscriber based on the received monitoring control message,
wherein the one or more filter parameters comprise one or more dynamic identifiers and/or transport layer information in relation to at least a portion of the communication relating to the subscriber handled by the network node, and
wherein the dynamic identifiers are communication-related identifiers that are generated for the at least a portion of the communication relating to the subscriber handled by the network node; and
sending a filter parameter message indicative of the determined one or more filter parameters to a monitoring node separate from the network node for filtering of the communication relating to the subscriber in accordance with the one or more filter parameters.

16. The method according to claim 15, wherein the communication relating to the subscriber comprises signaling messages and the monitoring node is a signaling monitoring node, wherein the method further comprises:
extracting one or more of the signaling messages or parts thereof in accordance with the one or more filter parameters in the filter parameter message.

17. The method according to claim 15, further comprising:
determining a telecommunication network wide unique communication reference identifier based on the received monitoring control message; and
sending the filter parameter message comprising the determined communication reference identifier to the monitoring node.

18. The method according to claim 15, wherein the dynamic identifiers are generated for establishment of the at least a portion of the communication relating to the subscriber handled by the network node, for ongoing communications of the at least a portion of the communication relating to the subscriber handled by the network node, and/or for termination of the at least a portion of the communication relating to the subscriber handled by the network node.

19. A method of operating a monitoring node for a telecommunication network comprising a network node which is separate from the monitoring node, wherein the method comprises:
receiving a filter parameter message indicative of one or more filter parameters for filtering communication relating to a subscriber in the telecommunication network,
wherein the one or more filter parameters comprise one or more dynamic identifiers and/or transport layer information in relation to at least a portion of the communication relating to the subscriber handled by the network node, and wherein the dynamic identifiers are communication-related identifiers that are generated for the at least a portion of the communication relating to the subscriber handled by the network node;

filtering said communication based on the received one or more filter parameters; and outputting the filtered communication.

20. The method according claim 19, wherein the dynamic identifiers are generated for establishment of the at least a portion of the communication relating to the subscriber handled by the network node, for ongoing communications of the at least a portion of the communication relating to the subscriber handled by the network node, and/or for termination of the at least a portion of the communication relating to the subscriber handled by the network node.

21. The method according claim 19, further comprising buffering communication in the telecommunication network in a buffer.

22. The method according to claim 19, wherein the filtering further comprises extracting one or more signaling messages or parts thereof in accordance with the one or more filter parameters wherein the monitoring node is a signaling monitoring node and wherein the signaling messages are part of the communication relating to the subscriber.

23. The method according to claim 19, further comprising:

relating the filtered communication to a telecommunication network wide unique communication reference identifier, wherein the telecommunication network wide unique communication reference identifier is comprised in the filter parameter message.

24. The method according to claim 23, further comprising:

receiving at least one further filter parameter message from at least one further network node, each of the at least one further filter parameter message comprising said communication reference identifier; and relating the filtered communication to said communication reference identifier.

25. The method according to claim 19, further comprising:

receiving a control parameter which comprises at least one instruction to remotely control the filtering at the monitoring node; and controlling the filtering in accordance with the at least one instruction.

26. A computer program product comprising a non-transitory computer-readable medium storing a computer program which, when being executed by a processor, is adapted to control or carry out a method according to claim 19.

* * * * *